United States Patent
Kakizaki

(10) Patent No.: US 8,138,990 B2
(45) Date of Patent: Mar. 20, 2012

(54) DISPLAY APPARATUS FOR DISPLAY OF UNREAL IMAGE IN FRONT OF VEHICLE

(75) Inventor: Masaru Kakizaki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/923,395

(22) Filed: Sep. 20, 2010

(65) Prior Publication Data

US 2011/0102303 A1  May 5, 2011

(30) Foreign Application Priority Data

Nov. 4, 2009 (JP) ................................. 2009-253343

(51) Int. Cl.
*G09G 5/00* (2006.01)

(52) U.S. Cl. .............. 345/7; 345/1.2; 345/204; 345/207

(58) Field of Classification Search ........... 345/204–215
See application file for complete search history.

(56) References Cited

U.S. PATENT DOCUMENTS

| | | | |
|---|---|---|---|
| 6,327,536 B1* | 12/2001 | Tsuji et al. ..................... | 701/301 |
| 2005/0134479 A1* | 6/2005 | Isaji et al. ..................... | 340/901 |
| 2005/0273263 A1* | 12/2005 | Egami et al. .................. | 701/301 |

FOREIGN PATENT DOCUMENTS

| | | |
|---|---|---|
| JP | A-7-144557 | 6/1995 |
| JP | A-7-146154 | 6/1995 |
| JP | A-2005-215879 | 8/2005 |
| JP | A-2005-265573 | 9/2005 |
| JP | A-2005-346177 | 12/2005 |

OTHER PUBLICATIONS

Office Action mailed Aug. 9, 2011 in corresponding JP application No. 2009-253343 (and English translation).

* cited by examiner

*Primary Examiner* — Vijay Shankar
(74) *Attorney, Agent, or Firm* — Posz Law Group, PLC

(57) ABSTRACT

A vehicular display apparatus displays, as an unreal image at an on-road position in front of a vehicle, a bar-shaped image that indicates a distance from the on-road position to a spot for right/left turn in a guidance route. The unreal image is generated by using a liquid crystal panel via a windshield and seen by a driver by designating a display position of the bar-shaped image on the liquid crystal panel based on a distance from the vehicle to the spot and the distance from the on-road position to the spot. Further, based on an instruction operation of the driver, the display of the bar-shaped image is switched between (i) a first image and (ii) a second image, which is more blurry than the first image.

4 Claims, 5 Drawing Sheets

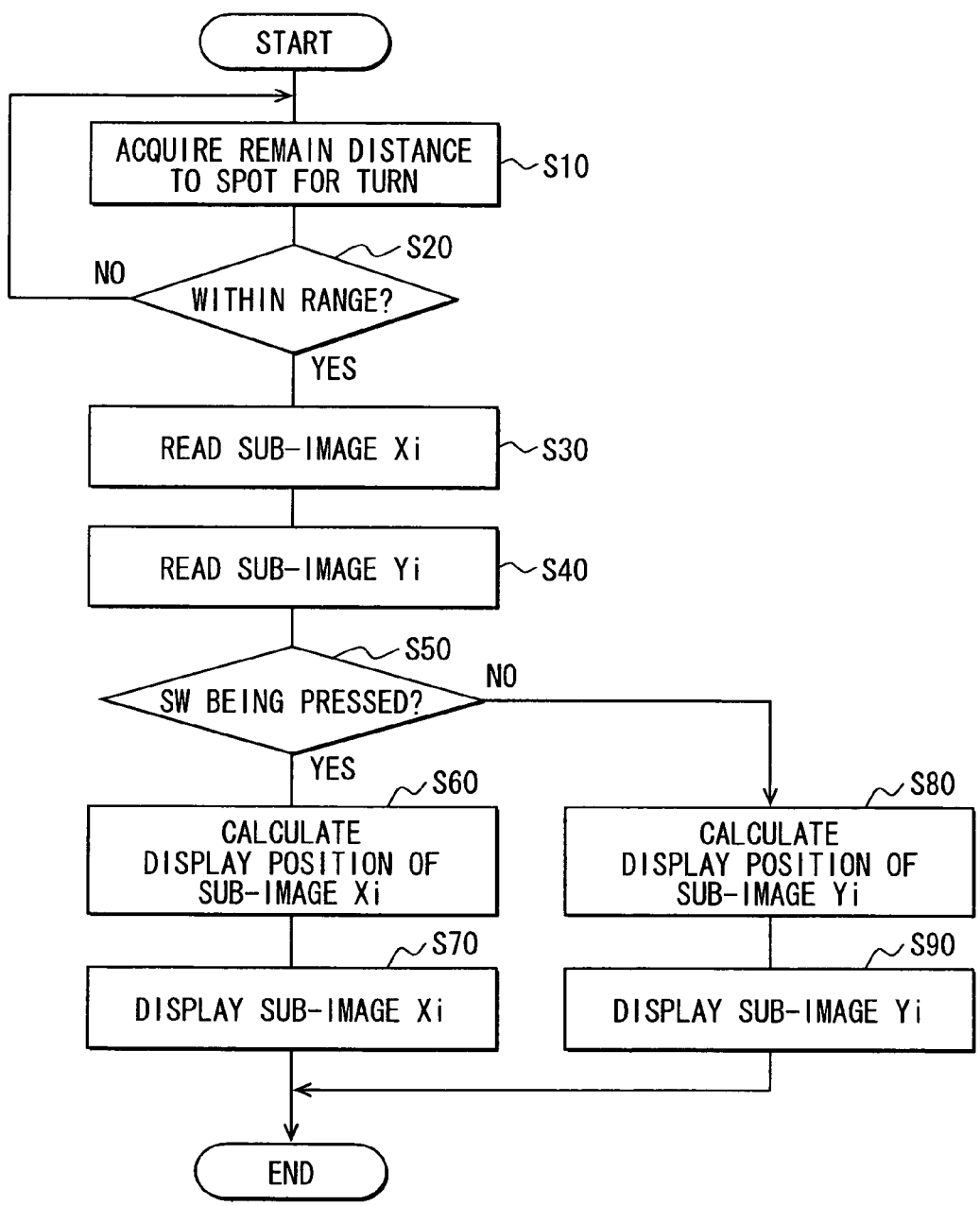

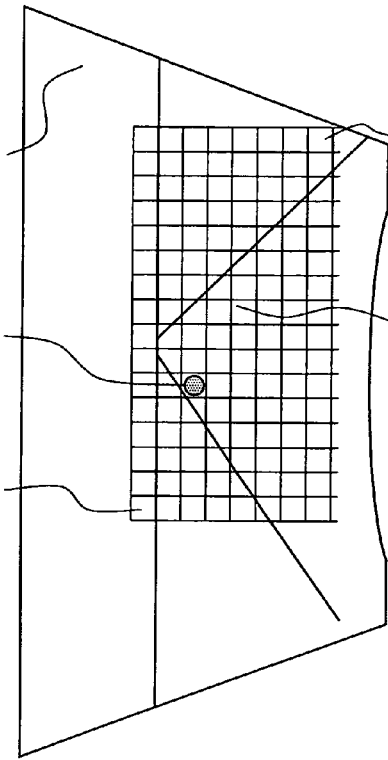

DISPLAY APPARATUS FOR DISPLAY OF UNREAL IMAGE IN FRONT OF VEHICLE

CROSS REFERENCE TO RELATED APPLICATION

The present application is based on and incorporates herein by reference Japanese Patent Application No. 2009-253343 filed on Nov. 4, 2009.

FIELD OF THE INVENTION

The present invention relates to a display apparatus which intelligibly notifies a vehicle driver of a distance up to a target spot such as a spot for right/left turn of a vehicle.

BACKGROUND OF THE INVENTION

[Patent document 1] JP-2005-346177 A

There is known an in-vehicle navigation system which obtains route guide information such as a distance to a spot for right/left turn of a subject vehicle or a turning direction at the spot for right/left turn, and displays on a head-up display a corresponding image (for example, a numerical value indicating the distance up to the spot for right/left turn or an arrow indicating a turning direction.

When a conventional navigation system has a wide display region (for example, almost whole of the windshield), a clear image for navigation is always displayed in a visual field of a driver. When information on navigation is unnecessary, the display of the clear image may cause the driver to feel bothersome. Furthermore, in cases that the image is displayed only when necessary, the driver is provided with a disadvantage to feel it difficult to recognize a position where the image is displayed.

In Patent document 1, the display size of the image is enlarged at the initial stage and made small subsequently. Such a display manner allows the driver to find the image more easily to some extent; however, the size of the displayed image thus changes to thereby pose a disadvantage to increase the botheration of the driver.

SUMMARY OF THE INVENTION

The present invention is made in view of the above situation. It is an object to provide a display apparatus for displaying an image in a manner to provide a driver with less botheration.

According to an example of the present invention, a display apparatus for a vehicle is provided as follows. An unreal image display device is configured to (i) output a light that displays an image, and (ii) cause a windshield or a combiner to reflect the light, enabling a driver to see the image as an unreal image in front of the vehicle. A distance acquisition device is configured to acquire a first distance from the vehicle to a predetermined target spot. A display position designation section is configured to enable the image to appear as an unreal image at an on-road position, which is a position on a road, in a view of the driver, the on-road position being at a second distance from the target spot by designating a display position of the image in the unreal image display device based on the first distance from the vehicle to the predetermined target spot and the second, distance from the target spot to the on-road position. An image selection section is configured to select, based on an instruction of the driver, one of (i) a first image, which indicates the second distance, and (ii) a second image, which indicates the second, distance and is gradated compared with the first image, as the image displayed in the unreal image display device at the display position designated by the display position designation section.

Under such a configuration of the present display apparatus, the image, which has the indication of the distance up to the target spot, can be viewed on a road at the distance from the target spot by a driver. Therefore, it is easier for the driver to understand the distance to the target spot practically.

In addition, under the above configuration, the driver can see the image on an actual road; thus, the driver can see the image, without need of moving the line of sight. In addition, when the driver does not perform an instruction or operation for displaying the first image (when the display of the first image is unnecessary), the first image is not displayed but the second image, which is more blurry than the first image, is displayed. The driver cannot see the edge of the blurred second image easily; thus, the driver is not concerned about the presence of the blurred second image. Therefore, when the display of the first image is unnecessary, the driver does not need to sense the botheration.

In addition, under the above configuration, even when the driver does not perform an operation for displaying the first image, the second image is displayed at the same display position as that of the first image. Therefore, even when the first image is not displayed, the driver can understand where the first image is to be displayed. When the first image is newly displayed, it is not necessary to look for it.

In addition, under the above configuration, the driver can see the first image on an actual road. This can reduce a confusion resulting from a mixture of the background other than the road with the first image.

As another example of the present invention, a method is provided for displaying an indication of a distance up to a target spot in front of a vehicle using a vehicular display apparatus having an unreal image display device that outputs a light that displays an image, and causes a windshield to reflect the light, enabling an eye of a driver to see the image as an unreal image in front of the vehicle. The method comprises: acquiring a first distance from the vehicle to a predetermined target spot; enabling the image to appear as an unreal image at an on-road position, which is a position on a road, in a view of the driver, the on-road position being at a second distance from the target spot by designating a display position of the image in the unreal image display device based on the first distance from the vehicle to the predetermined target spot and the second distance from the target spot to the on-road position; and selecting, based on an instruction of the driver, one of (i) a first image, which indicates the second distance, and (ii) a second image, which indicates the second distance and is more blurry than the first image, as the image displayed in the unreal image display device at the designated display position.

BRIEF DESCRIPTION OF THE DRAWINGS

The above and other objects, features, and advantages of the present invention will become more apparent from the following detailed description made with reference to the accompanying drawings. In the drawings:

FIG. 3 is a flowchart illustrating a process executed by the display apparatus;

FIGS. 4A to 4D are diagrams explaining a display position designation process for designating a display position of Image X;

DETAILED DESCRIPTION OF THE PREFERRED EMBODIMENTS

1. Configuration of Display Apparatus

Figure 1:
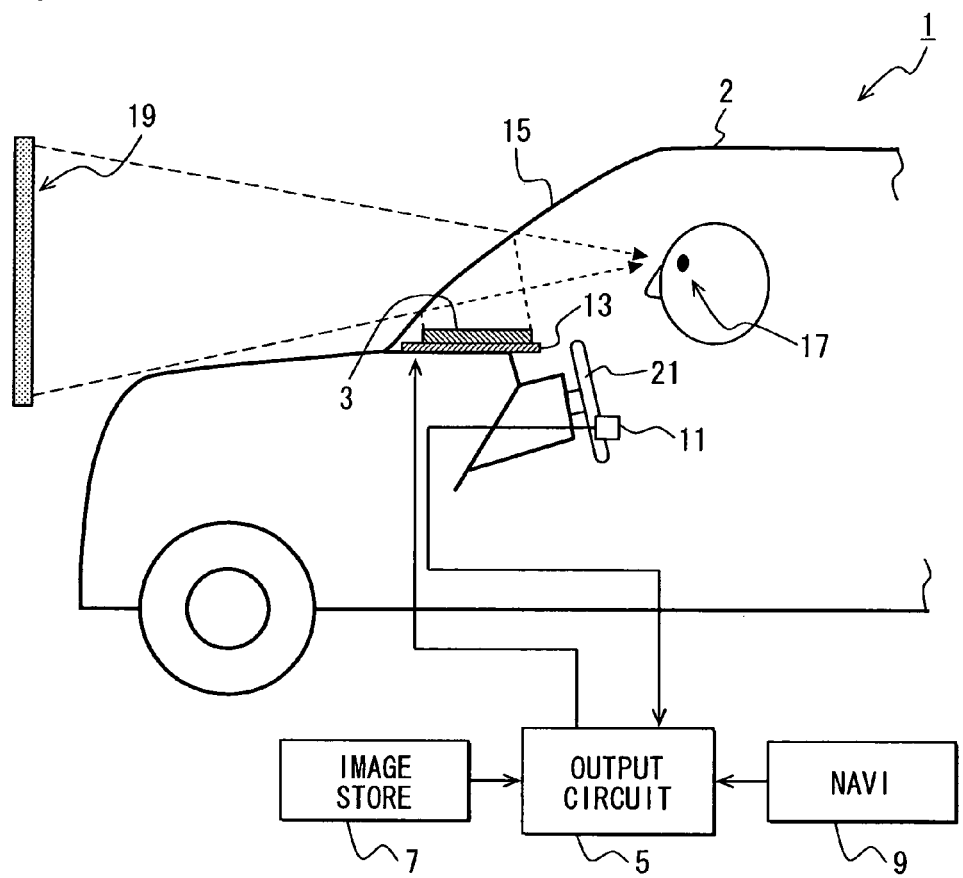
FIG. 1 is a block diagram illustrating a configuration of a display apparatus according to an embodiment of the present invention.
Figure 2A:
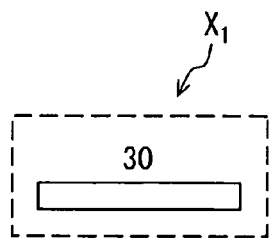
FIGS. 2A to 2C are diagrams explaining each of sub-images of Image X.
Figure 2B:
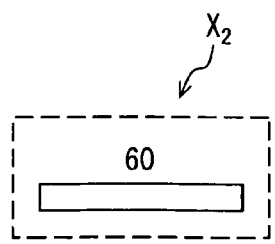
Figure 2C:
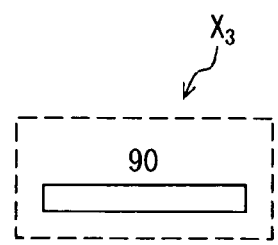

The configuration of a display apparatus 1 is explained based on FIG. 1 and FIGS. 2A to 2C. The display apparatus 1 is mounted in a subject vehicle 2. The display apparatus 1 includes a liquid crystal panel 3, an image superimposition output circuit 5, an image storage device 7, a route guidance device (or navigation device) 9, and a switch 11.

The image superimposition output circuit 5 outputs image data to a predetermined position on the liquid crystal panel 3. Hereinafter, such a position on the liquid crystal panel 3 is also referred to an on-panel position or an on-panel display position. The liquid crystal panel 3 is arranged on an instrumental panel 13, and displays an image outputted from the image superimposition output circuit 5. The light to display an image is outputted from the liquid crystal panel 3 and is reflected by a windshield 15 to thereby enter a viewpoint 17 of a driver of the subject vehicle 2. As a result, the driver can see an unreal image 19 of the image displayed on the liquid crystal panel 3 in front of the subject vehicle 2. Thus, the liquid crystal panel 3 can be also referred to as an unreal image display device or means.

The image superimposition output circuit 5 can output image data of an image X or an image Y to the liquid crystal panel 3. The image X and image Y are stored in the image storage device 7 and will be explained later. In addition, the image superimposition output circuit 5 performs a control for an on-panel display position of the image X or image Y on the liquid crystal panel 3 such that the unreal image of the image X or image Y appears at a predetermined position in the driver's view. Such a control is mentioned later.

The image storage device 7 stores three kinds (i.e., three sub-images) of the image X, and three kinds (i.e., three sub-images) of the image Y. The image X includes the following: an image (or sub-image) X1 (see FIG. 2A) containing a numerical value of "30," and a horizontal bar; an image (or sub-image) X2 (see FIG. 2B) containing a numerical value of "60," and a horizontal bar; and an image (or sub-image) X3 (see FIG. 2C) containing a numerical value of "90," and a horizontal bar. It is noted that each of "30," "60," and "90" corresponds to a distance A. Here, when "d" is defined as a distance interval equal to "30", "30," "60," and "90" are expressed by d (or 1d), 2d, and 3d, respectively. The image Y includes three kinds or sub-images: an image (or sub-image) Y1 which is generated by gradating or fading the image X1 in its entirety, an image (or sub-image) Y2 which is generated by gradating the image X2 in its entirety, and an image (or sub-image) Y3 which is generated by gradating the image X3 in its entirety. The entire images of the sub-images Y1 to Y3 are thus gradated; thus, the outline edges or designs of the sub-images Y1 to Y3 cannot be recognized or discerned easily. The sub-images Y1 to Y3 are previously prepared based on the sub-images X1 to X3, respectively. The method for such preparation can use an already known method, for example, a method of using a Gaussian distribution function.

The image storage device 7 outputs an image, which is requested by the image superimposition output circuit 5 (e.g., one to three kinds or sub-images), out of the sub-images. X1 to X3 and the sub-images Y1 to Y3, to the image superimposition output circuit 5. The route guidance device 9 contains a GPS and calculates a present position of the subject vehicle. In addition, the route guidance device 9 has a function of retrieving a route to a destination designated by a driver using a well-known method, and executing a route guidance. The route guidance device 9 can acquire a position of a spot (i.e., a target spot) for right/left turn in the route. Based on the position of the spot for right/left turn and a present position of the subject vehicle, a distance B up to the position of the spot for right/left turn is calculated. The route guidance device 9 outputs the distance B to the image superimposition output circuit 5 when the distance B becomes a predetermined distance (for example, 100 m or less). Thus, the route guidance device or navigation device 9 can be also referred to as a distance acquisition device or means.

The switch 11 is arranged at a steering wheel 21 of the vehicle 2. The switch 11 outputs an ON signal to the image superimposition output circuit 5 only in a duration for the switch 11 itself is being pushed by the driver.

2. Process Executed by Display Apparatus

The process which the display apparatus 1 (in particular, the image superimposition output circuit 5) executes is explained based on a flowchart in FIG. 3. While the route guidance device 9 is under execution of a route guidance, the present process is executed repeatedly from the start to the end.

It is further noted that a flowchart or the processing of the flowchart in the present application includes sections (also referred to as steps), which are represented, for instance, as S10. Further, each section can be divided into several subsections while several sections can be combined into a single section. Furthermore, each of thus configured sections can be referred to as a means or unit and achieved not only as a software device but also as a hardware device.

At S10, the image superimposition output circuit 5 acquires, from the route guidance device 9, a distance at the present time (hereinafter, also referred to as a remaining distance) up to a spot (target spot) for right/left turn of the vehicle 2 in a route along which the route guidance is performed. When the route includes several spots for right/left turn, a remaining distance up to the closest spot for right/left turn in the route is acquired.

At S20, it is determined whether the remaining distance acquired at S10 is within a range from 10 m to 100 m (hereinafter, also referred to as a specified range). When it is within the specified range, the processing proceeds to S30. When it is not within the specified range, the processing returns to S10.

At S30, the sub-images X1 to X3 are read from the image storage device 7. At S40, the sub-images Y1 to Y3 are read from the image storage device 7. At S50, it is determined whether the switch 11 outputs an ON signal that indicates a status that the switch 11 is being presently pushed by the driver. When the ON signal is outputted, the processing proceeds to S60. When the ON signal is not outputted, the processing proceeds to S80.

At S60, an on-panel display position of the sub-image X1 in the liquid crystal panel 3 is designated such that the sub-image X1 containing the display of the numerical value of "30" appears at a position on a road 30 meters short of a spot for right/left turn in the view of the driver.

The method for designating a display position is explained based on an example. Suppose that a remaining distance acquired at S10 is 100 meters. In this case, 70 meters is obtained by subtracting 30 meters from 100 meters. When the remaining distance is 100 meters, "the sub-image X1 appears at a position on a road 30 meters short of a spot for right/left turn in the view of the driver" is equal to "the sub-image X1 appears at a position on a road 70 meters ahead of the vehicle 2 in the view of the driver." To achieve "the sub-image X1 appears at a position on a road 30 meters short of a spot for right/left turn in the view of the driver," the on-panel display position of the sub-image X1 on the liquid crystal panel 3 is designated such that "the sub-image X1 appears at a position on a road 70 meters ahead of the vehicle 2 in the view of the driver."

The image superimposition output circuit 5 is provided with a correspondence table which indicates a correspondence or association between (i) an on-panel display position of an image on the liquid crystal panel 3, and (ii) an on-road position on a road of the image in the view of the driver as indicated in FIG. 4B. In the correspondence table, the on-panel display position on the liquid crystal panel 3 is specified by a coordinate of the direction X and a coordinate of the direction Y, as indicated in FIG. 4A. In addition, in the correspondence table, the on-road position on the road in the view of the driver is specified by a distance from the subject vehicle 2 and a horizontal distance from the subject vehicle. It is noted that the horizontal distance from the subject vehicle 2 is a distance (or referred to as a lateral deviation) in the vehicle width direction, which is orthogonal to the heading direction of the vehicle, as indicated in FIG. 4D. Along a center axis passing through the center of the vehicle, the horizontal distance is defined as being zero (0). The right side of the center axis is expressed by a positive value, whereas the left side is expressed by a negative value.

As indicated in the correspondence table in FIG. 4B, for example, an on-panel display position α on the liquid crystal panel 3 having a coordinate of 5 in the direction X and a coordinate of 2 in the direction Y corresponds to a set of (i) a distance of 70 meters from the subject vehicle 2 and (ii) a horizontal distance of −2.0 meters from the subject vehicle 2. Another on-panel display position on the liquid crystal panel 3 also corresponds to a coordinates set of (i) a distance from the subject vehicle 2 and (ii) a horizontal distance from the subject vehicle 2. When an image at the display position a on the liquid crystal panel 3 appears or is displayed at a position (e.g., an on-road position) indicated in FIG. 4C as an unreal image via the windshield 15. The position (e.g., the on-road position) appears at a position (which is corresponded to in the correspondence table by a coordinates set of (i) a distance of 70 meters from the subject vehicle 2 and (ii) a horizontal distance of −2.0 meters from the subject vehicle 2 in the view of the driver, as indicated in FIG. 4D.

The image superimposition output circuit 5 designates as a display position of the sub-image X1 an on-panel position, which is corresponded to in the correspondence table by a spot located at a forward position having a distance of 70 meters from the subject vehicle 2 and a given horizontal distance from the subject vehicle 2. The horizontal distance from the subject vehicle 2 can be designated or set up by the driver via an input means which is not illustrated. For example, when the driver sets the horizontal distance from the subject vehicle 2 to −2.0 meters, the value of −2.0 is used.

As a result, when the sub-image X1 is displayed as an unreal image via the windshield 15, the sub-image X1 is seen at a position on a road 70 meters ahead of the vehicle 2 in the (forward) view of the driver. In addition, similar to the sub-image X1, the on-panel display position of the sub-image X2, which contains the indication of a numeral value of "60," on the liquid crystal panel 3 is designated such that the sub-image X2 appears at a position on a road 60 meters short of the spot for right/left turn in the (forward) view of the driver.

In addition, similar to the sub-image X1, the on-panel display position of the sub-image X3, which contains the indication of a numeral value of "90," on the liquid crystal panel 3 is designated such that the sub-image X3 appears at a position on a road 90 meters short of the spot for right/left turn in the (forward) view of the driver.

The above explains the case that the remaining distance is 100 meters; however, at S60, the display position is designated with respect to only a sub-image X indicating a numeral value smaller than the remaining distance. For example, as mentioned above, when the remaining distance is 100 m, the display position is designated with respect to each of the sub-images X1 to X3. When the remaining distance is 70 m, only the display positions of the sub-images X1 and X2 are designated while the display position of the sub-image X3 is not designated. When the remaining distance is 40 m, only the display position of the sub-image X1 is designated while display positions of the sub-images X2 and X3 are not designated. When the remaining distance is 20 m, display positions are not designated with respect to all sub-images X1 to X3. To be mentioned later, the sub-image Xi whose display position was not designated is not displayed at S70, naturally. Here, Xi means X1, X2, X3.

At S70, the image X or sub-image Xi is displayed at the on-panel display position on the liquid crystal panel 3 designated at S60. For example, when the display position of the sub-image X1, the display position of the sub-image X2, and the display position of the sub-image X3 are all designated, the sub-image X1, the sub-image X2, and the sub-image X3 are displayed at the designated display positions, respectively. In addition, when the display position of the sub-image X1 and the display position of the sub-image X2 are designated, the sub-image X1 and the sub-image X2 are displayed at the designated display positions, respectively. In addition, when only the display position of the sub-image X1 is designated, the sub-image X1 is displayed at the designated display position.

Figure 5:
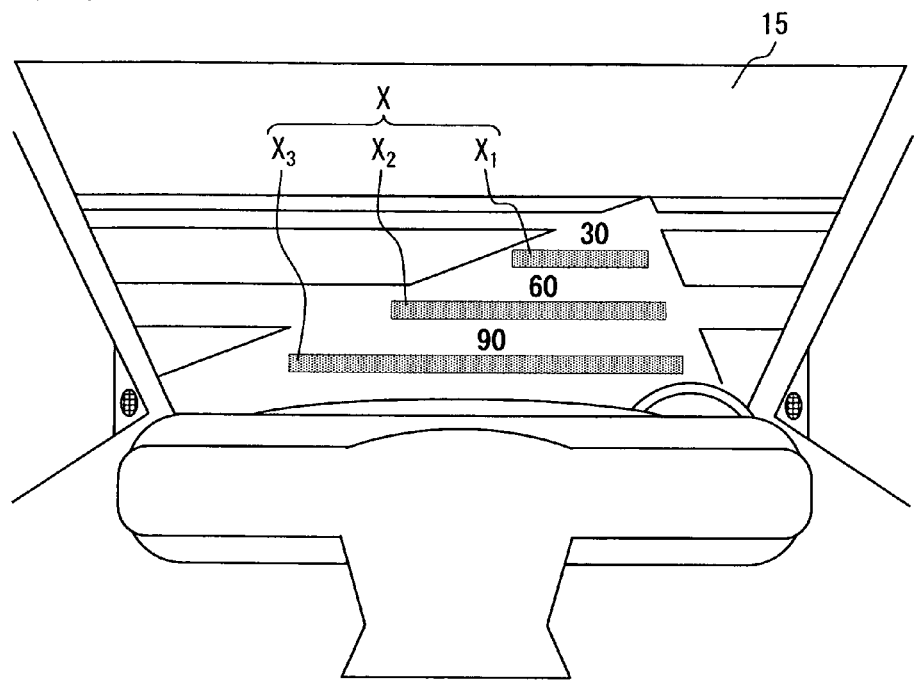
FIG. 5 is a diagram explaining a display state of Image X.

FIG. 5 illustrates a state of the display when the display position of the sub-image X1, the display position of the sub-image X2, and the sub-image X3 are designated. In such a state, the driver see an unreal image via the windshield 15 such that the sub-image X1 appears at a position on a road 30 meters short of the spot for right/left turn, the sub-image X2 appears at a position on a road 60 meters short of the spot for right/left turn, and the sub-image X3 appears at a position on a road 90 meters short of the spot for right/left turn.

The display sizes of the sub-image X1, the sub-image X2, and the sub-image X3 are adjusted to be seen by the driver within the width of the road. For example, when the width of the road is 3 meters, the image or sub-image is adjusted to be 2 meters wide in the view of the driver. In a conversion method of display sizes of the images, the number of pixels to match 2 meters width is calculated using the above correspondence table, and reduction and enlargement are made so as to fit the intended width. In addition, the conversion may be made by predetermining the conversion ratio of the display size for every display distance. The road width may be previously stored by the route guidance device 9 in association with positions on roads, or obtained as needed via an infrastructure communications method. After S70, the process once ends. Then, the process is executed repeatedly from the start (i.e., from at S10) to the end (i.e., to S70 or S90).

At S80, the on-panel display position of the sub-image Y1 on the liquid crystal panel 3 is designated like the method to designate the on-panel display position of the sub-image X1 on the liquid crystal panel 3. Further, the on-panel display position of the sub-image Y2 on the liquid crystal panel 3 is designated like the method to designate the on-panel display position of the sub-image X2 on the liquid crystal panel 3. Further, the on-panel display position of the sub-image Y3 on the liquid crystal panel 3 is designated like the method to designate the on-panel display position of the sub-image X3 on the liquid crystal panel 3. Thus, by executing the processing at S60, S80, the image superimposition output circuit 5 may function as a display position designation section or means.

Further, similar to the case of the image X or sub-images Xi, the display position is designated with respect to only a sub-image Yi indicating a numeral value smaller than the remaining distance. Here, Yi means Y1, Y2, and Y3. The sub-image Yi whose display position was not designated is not displayed at S90, which will be explained later.

At S90, the image Y (i.e., sub-images Yi) is displayed at the display position on the liquid crystal panel 3 designated at S80. For example, when the display position of the sub-image Y1, the display position of the sub-image Y2, and the display position of the sub-image Y3 are designated, the sub-image Y1, the sub-image Y2, and the sub-image Y3 are displayed at the designated display positions, respectively. In addition, when the display position of the sub-image Y1 and the display position of the sub-image Y2 are designated, the sub-image Y1 and the sub-image Y2 are displayed at the designated display positions, respectively. In addition, when only the display position of the sub-image Y1 is designated, the sub-image Y1 alone is displayed at the designated display position. Thus, by executing the processing at S50 to S90, the image superimposition output circuit 5 may function as an image selection section or means.

Figure 6:
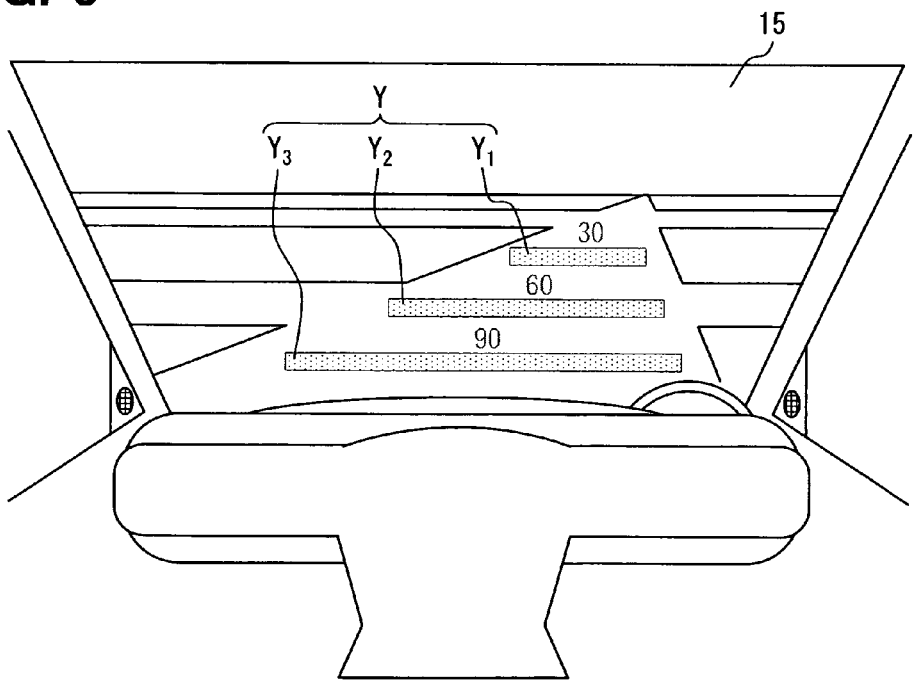
FIG. 6 is a diagram explaining a display state of Image Y.

FIG. 6 illustrates a state of the display when the display positions of the sub-image Y1, the display position of the sub-image Y2, and the sub-image Y3 are designated. In such a state, the driver sees an unreal image via the windshield 15 such that the sub-image Y1 appears at a position on a road 30 meters short of the spot for right/left turn, the sub-image Y2 appears at a position on a road 60 meters short of the spot for right/left turn, and the sub-image Y3 appears at a position on a road 90 meters short of the spot for right/left turn. That is, the sub-images Y1 to Y3 are seen from the driver at the same on-road positions as those of the sub-images X1 to X3, respectively.

The display sizes of the sub-image Y1, the sub-image Y2, and the sub-image Y3 are adjusted to be within the road width in the view of the driver, similarly to the method to adjust the display sizes of the sub-image X1, the sub-image X2, and the sub-image X3 at S70. After S90, the process once ends. Then, the process is repeatedly executed from at S10.

3. Effect by Display Apparatus (1) The display apparatus 1 displays a sub-image Xi at a position on a road P (P=30, 60, 90) meters short of a spot for right/left turn in respect of the view of the driver, while the sub-image Xi contains the indication of "P." Therefore, it is easier for the driver to understand the distance to the spot for right/left turn practically or sensuously.

(2) The sub-image Xi appears on an actual road in the view of the driver; thus, the driver can see the sub-image Xi, without need of moving the line of sight.

(3) When the driver does not press or manipulate the switch 11 (i.e., when the display of the sub-image Xi is unnecessary), the sub-images X1 to X3 are not displayed, but the sub-images Y1 to Y3 blurred as a whole are displayed. The driver cannot see the edge of the blurred image easily; thus, the driver is not so concerned about the existence of the blurred image. Therefore, when the display of the image X (i.e., sub-images Xi) is unnecessary, the driver can be relieved from sensing botheration.

(4) Even when the driver does not press or manipulate the switch 11, the sub-images Y1 to Y3 are displayed as unreal images at the same on-road positions as those of the sub-images X1 to X3, respectively. Therefore, even when the sub-images X1 to X3 are not displayed, the driver can understand where those sub-images X1 to X3 are to be displayed. This eliminates need to look for the sub-image Xi which is newly displayed.

(5) The sub-image Xi is displayed on a road; this can reduce a confusion resulting from a mixture of the background (other than the road) with the sub-image Xi.

(6) The remaining distances which the display apparatus 1 displays by the sub-images X1 to X3 are 30 m, 60 m, and 90 m, which are distributed with the regular intervals. Therefore, the driver can easily estimate where the spot for right/left turn is located. This can achieve an easy information provision.

(7) The remaining distances which the display apparatus 1 displays by the sub-images X1 to X3 are fixed values of 30m, 60m, and 90m. Thus, even when the blurred or gradated sub-images Y1 to Y3 are displayed with the remaining distances being unclearly or hardly read, the remaining distances can be estimated by the driver. Information provision to the driver or user can be thus more intelligibly performed.

The present invention is not limited to the above mentioned embodiment at all. It can be achieved in various manners within a scope not departing from the present invention. For example, the image X and the image Y may not be previously stored in the image storage device 7, but they may be prepared by the image superimposition output circuit 5 as needed.

In addition, the position of the subject vehicle, the remaining distance, the width of the road, etc. may be acquired from the outside of the vehicle using infrastructural communications means. In addition, under the basis of the image X or sub-image Xi, the image Y or sub-image Yi is more blurry in its entity than the image X or sub-image Xi; furthermore, the image Y or sub-image Yi may be also less bright than the image X or sub-image Xi.

Figure 7:
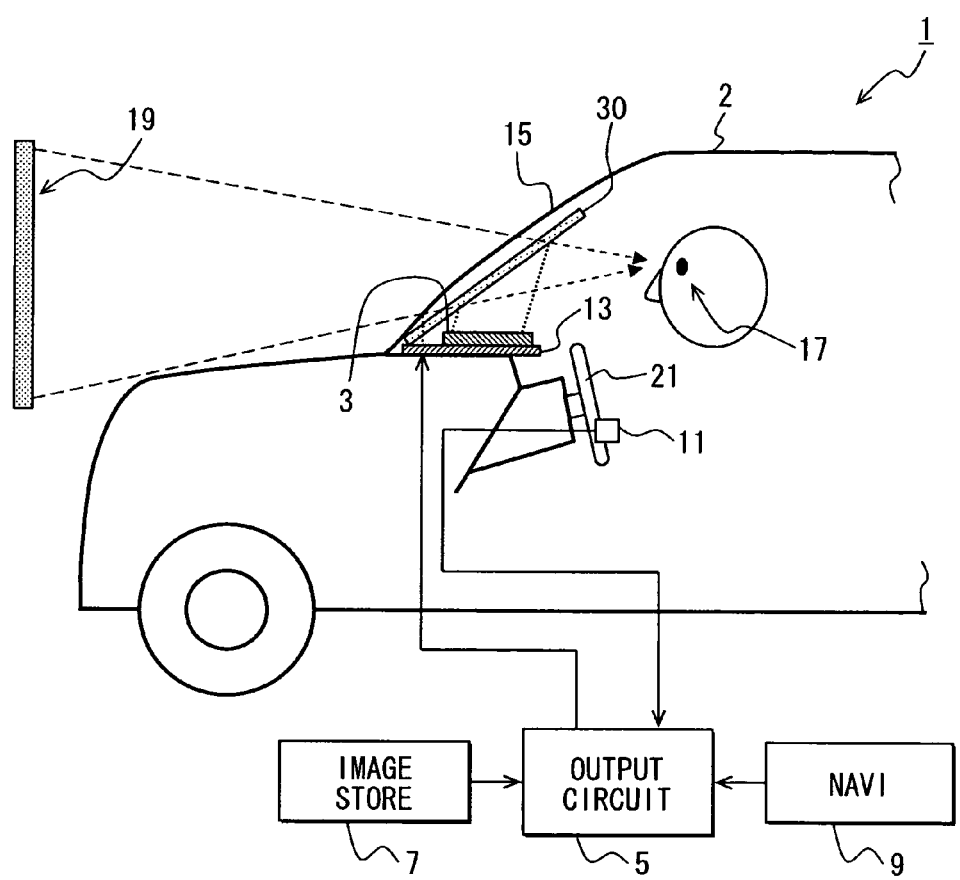
FIG. 7 is a block diagram illustrating another configuration of the display apparatus according to the embodiment of the present invention.

In addition, the light outputted from the liquid crystal panel 3 may be reflected by a combiner 30 instead of the windshield 15, as indicated in FIG. 7.

Aspects of the disclosure described herein are set out in the following clauses.

As an aspect of the disclosure, a display apparatus for a vehicle is provided as follows. An unreal image display device is configured to (i) output a light that displays an image, and (ii) cause a windshield or a combiner to reflect the light, enabling a driver to see the image as an unreal image in front of the vehicle. A distance acquisition device is configured to acquire a first distance from the vehicle to a predetermined target spot. A display position designation section is configured to enable the image to appear as an unreal image at an on-road position, which is a position on a road, in a view of the driver, the on-road position being at a second distance from the target spot by designating a display position of the image in the unreal image display device based on the first distance from the vehicle to the predetermined target spot and the second distance from the target spot to the on-road position. An image selection section is configured to select, based on an instruction of the driver, one of (i) a first image, which indicates the second distance, and (ii) a second image, which indicates the second distance, the second image being gradated compared with the first image, as the image displayed in the unreal image display device at the display position designated by the display position designation section.

As an optional aspect of the above display apparatus, the second distance may include at least three distances of (1×d), (2×d), and (3×d) from the target spot, wherein d is a distance interval. Further, the display position designation section may be further configured to designate at least three display positions of the image in the unreal image display device, the display positions corresponding to the at least three distances from the target spot, respectively. The image selection section may be further configured to select, as the image by the unreal image display device, one of (i) the first image (Xi) that indicates each of the at least three distances and (ii) the second image (Yi), which is gradated compared with the first image, as the image displayed in the unreal image display device at each of the at least three display positions designated by the display position designation section.

In this case, the image indicates the distances or distance intervals of d, 2d, 3d, . . . ; thus, those distances are arranged with constant intervals. Therefore, the driver can easily estimate where the target spot is located. This can achieve an easy information provision method.

As a further optional aspect of the just above display apparatus, the distance interval may be a predetermined value.

Thus, the distance indicated by the image becomes a fixed value. The driver can estimate the distance, even when the blurred image is displayed and the numeral value of the distance A cannot be easily read. Information can be thus conveyed intelligibly.

As an optional aspect, the display apparatus may be cooperative with a navigation device that retrieves a guidance route to a designated destination. Here, the predetermined target spot may include a spot for the vehicle to be guided to perform a right or left turn in the guidance route.

As an optional aspect, the unreal image display device may be a liquid crystal panel arranged on an instrument panel of the vehicle to display the image, which is reflected by the windshield of the vehicle to enable the driver to see the image as the unreal image via the windshield in front of the vehicle. The image appearing as the unreal image may have a shape of a bar, which is orthogonal to a heading direction of the vehicle and accompanied by an indication of the distance up to the target spot.

It will be obvious to those skilled in the art that various changes may be made in the above-described embodiments of the present invention. However, the scope of the present invention should be determined by the following claims.

What is claimed:

1. A display apparatus for a vehicle, the apparatus comprising:
an unreal image display device configured to
output a light that displays an image, and
cause a windshield or a combiner to reflect the light, enabling a driver to see the image as an unreal image in front of the vehicle;
a distance acquisition device configured to acquire a first distance from the vehicle to a predetermined target spot;
a display position designation section configured to enable the image to appear as an unreal image at an on-road position, which is a position on a road, in a view of the driver, the on-road position being at a second distance from the target spot by designating a display position of the image in the unreal image display device based on the first distance from the vehicle to the predetermined target spot and the second distance from the target spot to the on-road position; and
an image selection section configured to select, based on an instruction of the driver, one of (i) a first image, which indicates the second distance, and (ii) a second image, which indicates the second distance and is gradated compared with the first image, as the image displayed in the unreal image display device at the display position designated by the display position designation section, wherein
the second distance includes at least three distances of (1×d), (2×d), and (3×d) from the target spot, wherein d is a distance interval,
the display position designation section being further configured to designate at least three display positions of the image in the unreal image display device, the display positions corresponding to the at least three distances from the target spot, respectively,
the image selection section being further configured to select, as the image by the unreal image display device, one of (i) the first image that indicates each of the at least three distances and (ii) the second image, which is gradated compared with the first image, as the image displayed in the unreal image display device at each of the at least three display positions designated by the display position designation section.

2. The display apparatus according to claim 1, wherein the distance interval is a predetermined value.

3. The display apparatus according to claim 1, cooperative with a navigation device that retrieves a guidance route to a designated destination,
wherein the predetermined target spot includes a spot for the vehicle to be guided to perform a right or left turn in the guidance route.

4. The display apparatus according to claim 1, wherein:
the unreal image display device is a liquid crystal panel arranged on an instrument panel of the vehicle to display the image, which is reflected by the windshield of the vehicle to enable the driver to see the image as the unreal image via the windshield in front of the vehicle; and
the image appearing as the unreal image has a shape of a bar, which is orthogonal to a heading direction of the vehicle and accompanied by an indication of the distance up to the target spot.

* * * * *